United States Patent [19]

Gammel et al.

[11] 4,286,334

[45] Aug. 25, 1981

[54] MICROPROCESSOR CONTROLLED ITERATIVE SWITCHING FM/PM RECEIVER FOR RECONSTRUCTING NOISE-CORRUPTED REDUNDANTLY TRANSMITTED INFORMATION

[75] Inventors: Josef Gammel, Munich; Rainer Fulda, Olching, both of Fed. Rep. of Germany

[73] Assignee: Siemens Aktiengesellschaft, Berlin & Munich, Fed. Rep. of Germany

[21] Appl. No.: 934,950

[22] Filed: Aug. 18, 1978

[30] Foreign Application Priority Data

Aug. 29, 1977 [DE] Fed. Rep. of Germany ....... 2738800

[51] Int. Cl.$^3$ .......................... H04L 1/02; H04L 1/08
[52] U.S. Cl. ........................ 375/40; 371/31; 371/69; 455/63; 375/51; 375/57
[58] Field of Search ............ 325/42, 65, 320, 41, 325/474, 323, 324, 348, 478; 343/18 E; 178/88; 340/146.1 BA, 146.1 BE; 371/31, 67, 68, 69; 375/38, 40, 100, 58, 51, 57; 455/52, 59, 63

[56] References Cited

U.S. PATENT DOCUMENTS

| 2,805,278 | 9/1957 | Van Duuren | 340/146.1 BA |
| 3,145,340 | 8/1964 | Janson et al. | 325/41 |
| 3,351,940 | 11/1967 | Ortwein et al. | 343/100 |
| 3,374,437 | 3/1968 | Heald | 325/348 |
| 3,409,875 | 11/1968 | De Jager et al. | 340/146.1 BE |
| 3,588,705 | 6/1971 | Paine | 325/348 |
| 3,781,794 | 12/1973 | Morris | 325/41 |
| 3,983,488 | 9/1976 | Bush et al. | 325/348 |
| 4,001,692 | 1/1977 | Fenwick et al. | 371/68 |
| 4,063,174 | 12/1977 | Gupta et al. | 375/40 |

Primary Examiner—Benedict V. Safourek
Attorney, Agent, or Firm—Hill, Van Santen, Steadman, Chiara & Simpson

[57] ABSTRACT

A radio communications transmission system in which the communication information is digitalized and impressed on a radio frequency carrier by means of frequency modulation and/or phase modulation and wherein at the receiving station the interference is recognized as amplitude modulation occurring at the output of the intermediate frequency stage and wherein when such interference occurrence is recognized the received data is identified as being faulty and is replaced by redundantly transmitted data which is received and stored at the receiving side so as to provide accurate transmission of data.

5 Claims, 5 Drawing Figures

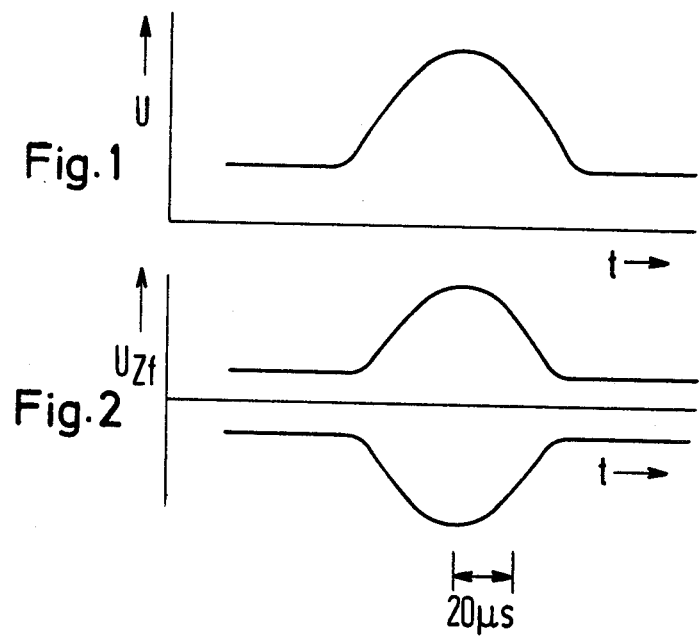
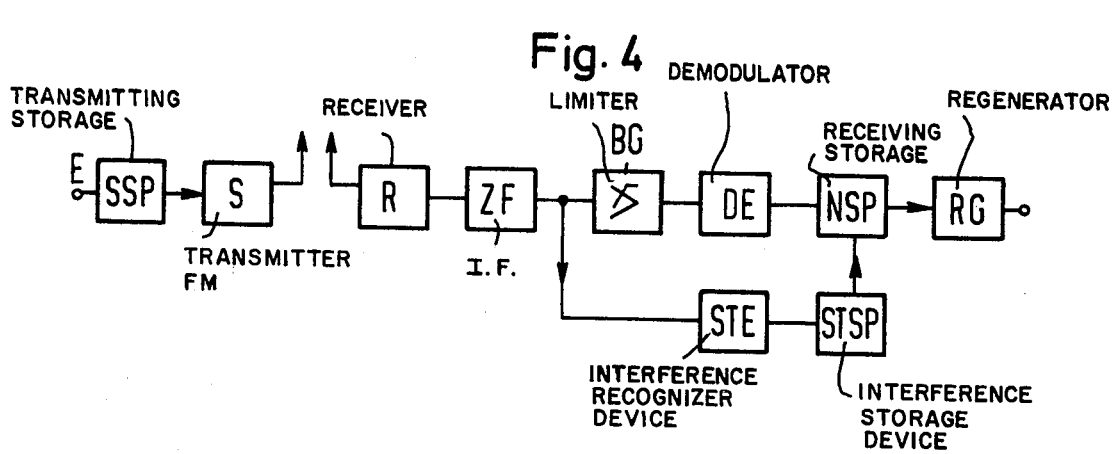

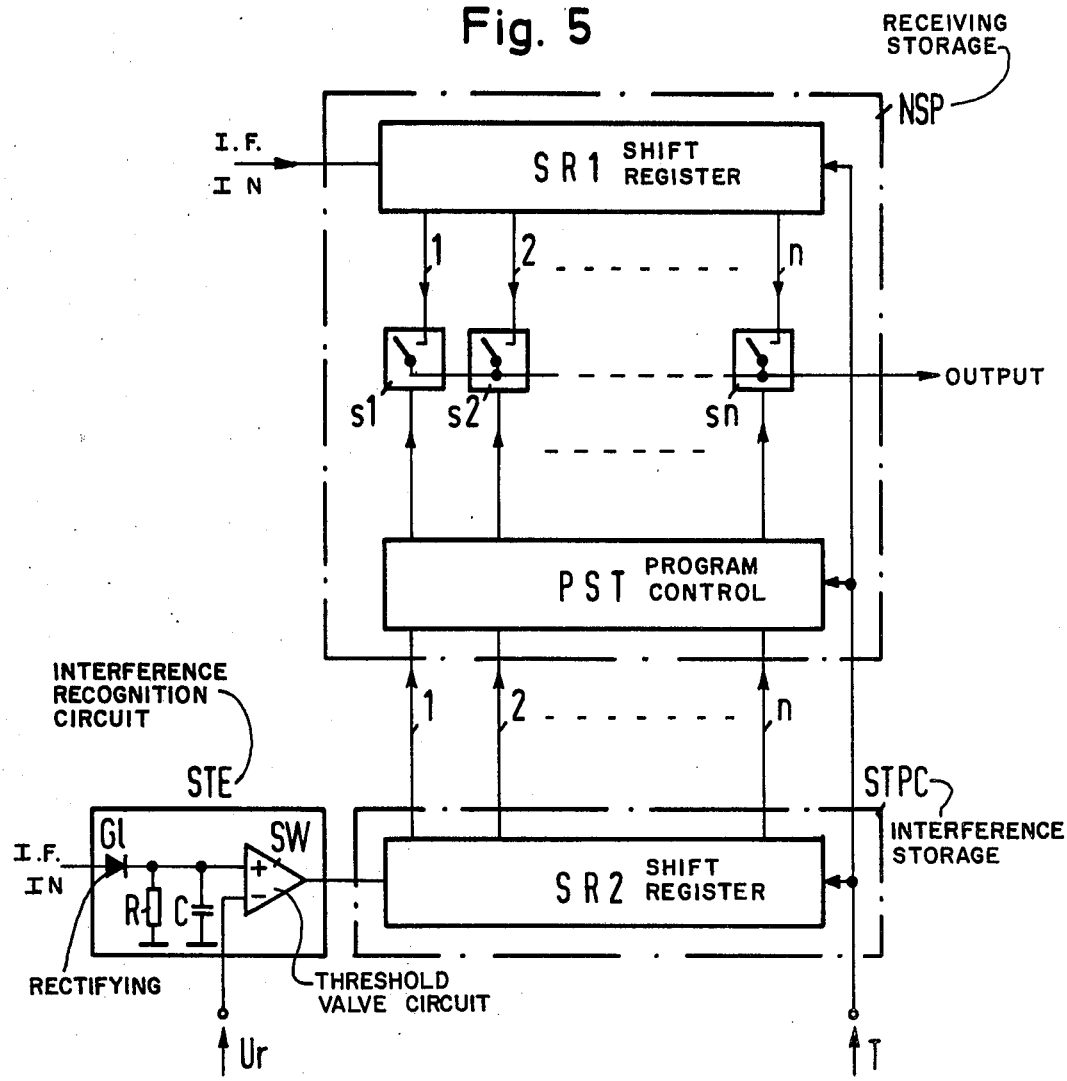

MICROPROCESSOR CONTROLLED ITERATIVE SWITCHING FM/PM RECEIVER FOR RECONSTRUCTING NOISE-CORRUPTED REDUNDANTLY TRANSMITTED INFORMATION

BACKGROUND OF THE INVENTION

1. Field of the Invention

This invention relates in general to radio communication transmission systems and in particular to a novel communication system.

2. Description of the Prior Art

It is known to transmit data in digitalized form which is modulated onto a radio frequency carrier by means of frequency and/or phase modulation. In such systems interference occurs as, for example, by ignition sparks or interrupters, so-called manmade noise or by deliberate interference by enemies such as ECM methods.

SUMMARY OF THE INVENTION

The present invention provides under conditions of FM and/or PM transmission of radio intelligence to provide accurate transmission of intelligence without a substantial cost increase in the system outlay even though interference is present.

It is an object of the present invention to provide a radio communication transmission system wherein the bits of communication which are preferably in digitalized form are impressed by means of frequency modulation and are phase modulated onto a radio frequency carrier and wherein at the receiver an interference recognition means is provided which recognizes amplitude modulation occurring in the intermediate frequency signal which indicates that interference is occurring. The time period during which such interference occurs relative to the transmitted data is stored and those signal portions which have been recognized as being faulty due to the interference are eliminated from the normal communication flow and are replaced by information which has been communicated in a redundant form.

The redundancy can be provided by one or more simultaneous transmission paths or such redundancy can be provided by time-staggered multiple transmission of the same signal or a call-back system may be utilized such that the signal from the receiver is sent to the transmitter indicating when interference has occurred or alternatively, the radio frequency can be changed under control of the interference recognition device.

The invention allows the safeguard of data in communication transmission without the normally expected great increase in cost and without any fundamental additional time delay in transmission of the intelligence.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which:

BRIEF DESCRIPTION OF THE DRAWINGS

FIG. 1 is a plot of field strength voltage versus time illustrating interference occurring;

FIG. 2 is a plot of the output of the intermediate frequency voltage versus time when interference occurs;

FIG. 3-1 through FIG. 3-7 illustrate plots of signals which have been processed according to the invention;

FIG. 4 is a block diagram of the transmitting and receiving portion of the invention utilizing the interference elimination means of the invention; and FIG. 5 illustrates in detail a portion of the receiver.

DESCRIPTION OF THE PREFERRED EMBODIMENTS

Figure 3:
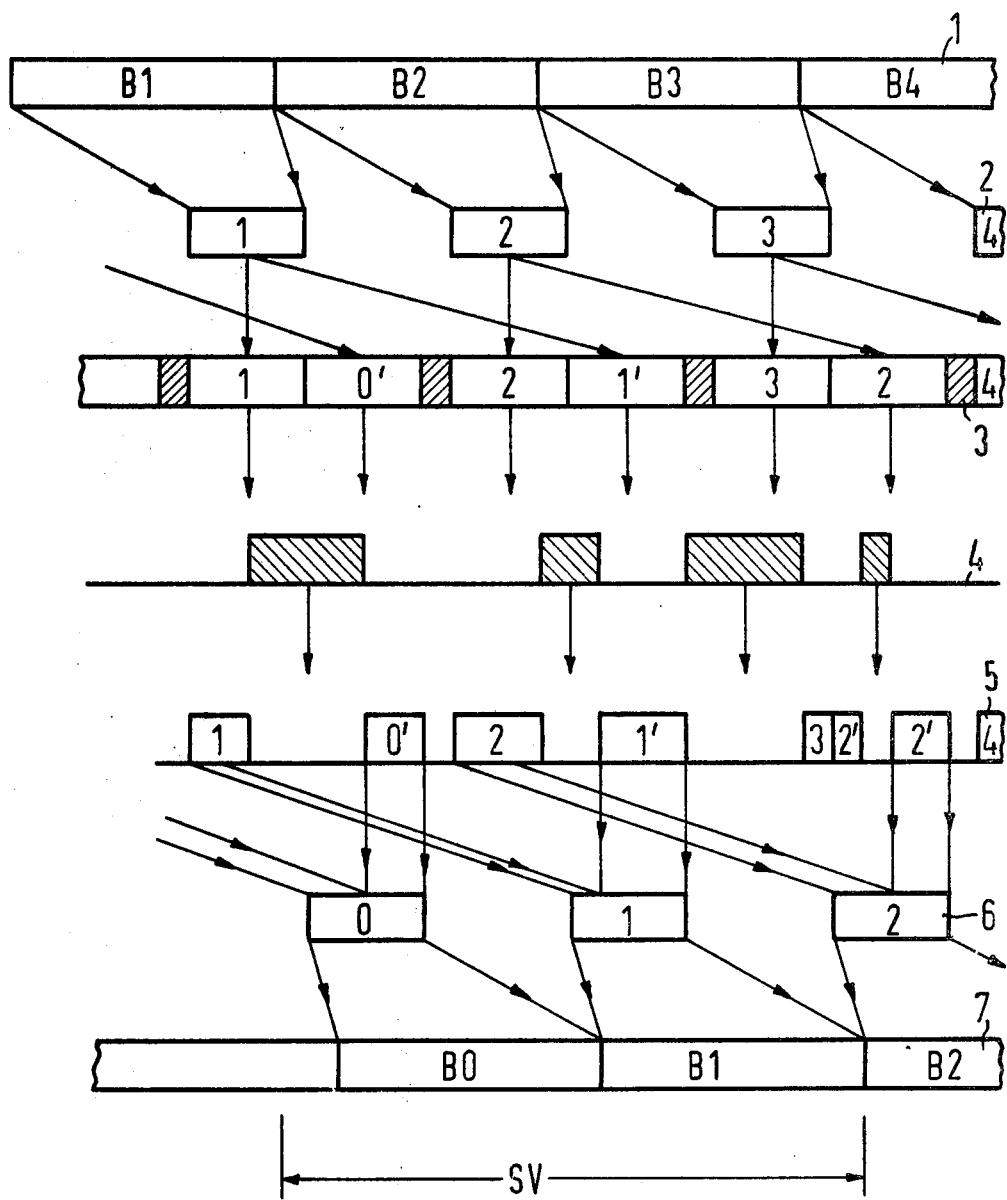

On the occurrence of interference in a radio communication transmission system employing frequency and-/or phase modulated carriers, at the receiving station a fluctuation in the field strength occurs as illustrated for example in FIG. 1. The large signal occurring in the center of FIG. 1 illustrates that interference is occurring. The radio frequency signal which is normally constant in amplitude U increases substantially even in the case of slight differences in field strength between the useful signal and interference signals.

FIG. 2 illustrates the associated amplitude curve at the output of an intermediate frequency stage in the receiver of a heterodyne receiver. These amplitude fluctuations produce distortions in the signal which cannot be eliminated even by the use of a limiter and a FM demodulator which receives the IF signal. This is true particularly where digitalized information is transmitted and thus communication which has been supplied and coded into the form of PCM, PDM or some other digital manner prior to modulation is very difficult to recognize in the presence of interference. The system is particularly sensitive to pulse interferences such as those in the form of interference bursts transmitted by those attempting to intentionally disturb the communication traffic who hope to render the transmission of data impossible. Prior art systems which provide a very high redundancy as, for example, transmitting the intelligence ten times to overcome such interference requires a very high cost for the system and provides a very great time delay.

As stated above, there is a simple possibility of recognizing interference in the radio path when amplitude modulation of greater or lesser degree occurs in the FM or PM signal. The present invention provides at the receiving station an interference recognition device which recognizes the amplitude modulation occurring in the intermediate frequency signal of the receiver upon the presence of interference and holds in store the information thus identifying the time during which the incoming signals are accurate and inaccurate. Thus, over a period of time which can be determined by the normally occurring interferences, it is possible to obtain a criteria as to when during the communication flow and for how long a time a signal section has a high degree of probability of being unintelligible or at least greatly distorted. Thus, it is advantageous to eliminate these items of communication from the stored communication content which do not represent information with a high probability of accuracy. Such eliminated data can be replaced by signals which are as free as possible from interference and which are provided in redundant form by some means or other as, for example, by call-back to the transmit. Signals which are accurately received on the first communication transmission and the signals which are replaced due to the inaccurate transmission are then correctly reassembled relative to time in an adder and supplied to an output circuit in the receiver.

The simplest form of redundancy can be provided in that the item of communication is transmitted simultaneously on one or more than one simultaneous transmission path. By replacing disturbed sections as described above, it is thus possible to effect an extremely reliable communication transmission of intelligence in a relatively simple and inexpensive manner. This applies to both analog signals and particularly to digitalized form of communication as discussed above.

The redundancy can also be provided by time-staggered multiple transmission of the same signal—in other words, by block-wise transmission. Block-wise transmissions can be accomplished by double or multiple transmission of the same signal in time compressed blocks following directly after one another. Although this increases the number of bits in a transmission system due to the compression at the transmitter, the substantial increase in reliability justifies such system.

The redundancy could also be achieved in that a message could be transmitted from the receiver when disturbed communication elements were being received and such messages would be transmitted from the receiver to the transmitter and the transmitter would then deliberately repeat those sections where errors had occurred. This would have the advantage that the messages would be repeated only in those portions where recognized errors had occurred. At the receiver the portions which were blanked out from the information stored can be replaced by the repeated and accurately received data.

It is also possible to provide a system arrangement which provides for a combination of possibilities of eliminating interference occurring over a specific long time. Thus, for example, in particular, for a long term interference, a simultaneous transmission path can be connected or a change in radio frequency can be accomplished under the controls of a logic system. In any case, the interference can be analyzed at the receiving end and the control of the method and redundancy can be accomplished with a subsidiary device connected to the interference recognition device at the receiver.

FIG. 3 is a time plan illustrating the assembly of signals which are subject to interference as well as those signals which are free of interference when the method of double transmission of communication blocks is utilized. Full communication blocks are represented at the system input by the uppermost row by blocks B1 through B4. It is, of course, expedient to carry out a division into blocks of equal length although transmitting with blocks of different lengths is possible. The blocks B1 through B4 are converted into the blocks 1, 2, 3 and 4 at the transmitter by storage and time compression and illustrated in FIG. 3-2. Thus, here the bit rate is increased for the purpose of double transmission. Finally, at the transmitter with this assumed form of organization, the intelligence is transmitted as illustrated in FIG. 3-3 such that block 1 is followed by the second transmission of block 0' after which a synchronizing signal shown in shaded lines occurs then block 2 is transmitted followed by a repeated transmission of block 1 in the form of 1' and then another synchronizing signal, etc. as shown. FIG. 3-4 illustrates the occurrence of interference on a time scale and during the occurrence of such interference a switching function acts upon the radio path. The interference is indicated in shaded form according to the duration and time sequence of the interference.

It is assumed that the interference function renders the items of communication transmitted during such interference unintelligible and for this reason the intelligence received at the receiver during such interference periods is erased from the storage means at the receiver.

FIG. 3-5 illustrates the received information which remains after the erasure of the received information which was received during an interference period. It is to be noted that from intelligence block 1, two portions are received from which the original transmitted block 1 can be reconstructed at the receiver. These are a portion of the initial block 1 designated by 1 in FIG. 3-5 and a portion of the transmission from block 2 identified by 1' in FIG. 3-5. Such reconstruction of information block 1 is illustrated in FIG. 3-6. It is also noted that information block 0 and 2 are reconstructed by utilizing portions of the received information which did not occur at the time of interference.

FIG. 3-7 illustrates the reconstructed information at the receiver which has been reconstructed according to the invention. It is to be noted that a system delay of SV as indicated between the informatin has occurred.

FIG. 4 is block circuit diagram of a communication transmission system according to the invention. The information which is to be transmitted E is supplied to a transmitting storage means SSP in the form of digital signals. The transmitting storage means SSP supplies data out at somewhat greater than double the speed as illustrated in FIG. 3-2. This allows the data to be doubly transmitted and additional items of synchronizing information can also be transmitted. Such items of data are fed to the transmitter in the form of a frequency modulation signal where they are modulated onto a carrier and radiated. A receiver R receives the output of the transmitter S as well as interfering signals. At the output of the receiver IF, ZF the data are fed in a conventional manner to a limiter BG which supplies an output to a demodulator DE which supplies an output to a receiving storage means NSP.

In parallel with the limiter demodulator and receiving storage means is an interference recognition device STE which also receives the output of the IF, ZF and this device detects when the variations in field strength illustrated in FIGS. 1 and 2 occur and determines when an interference voltage occurs. The interference recognition device STE supplies an output to an interference storage means STSP which holds in storage the periods of interference as illustrated in FIG. 3-4 so that it is known when the incoming signal has been destroyed. The output of the interference storage device STSP is connected to a receiving storage means NSP and erases the signals in the receiving storage means NSP which were received during the interference periods illustrated in FIG. 3-4. A regenerator RG receives the output of the receiving storage means NSP and regenerates the actual transmitted signal by restoring and processing the signals stored in the receiving storage means NSP.

FIG. 5 is a block circuit diagram illustrating the interference recognition device STE as well as the receiving storage means NSP and the interference storage means STSP.

The input to the interference recognition device STE comprises the output of the IF, ZF which is supplied to a rectifier GL which has a parallel combination of a capacitor C and resistor R connected to ground. A threshold value circuit SW receives on one of its input terminals the output of the rectifier GL and a reference potential voltage Ur is supplied to the second input terminal of the threshold value circuit SW. At any time that the signal received at the rectifier GL exceeds the reference voltage Ur which indicates that interference is occurring in the transmitted signal the output of the threshold value circuit SW will produce a voltage which is supplied to the interference storage circuit STPC. The interference storage circuit comprises the shift register SR2 and receives a timing signal T which is synchronized with the bit pulse train rate. The shift register SR2 is designed so as to accommodate a plurality of blocks as illustrated in FIG. 3 and has n time frames whose mutual spacing is determined by the bit number of a block.

The receiving storage device NSP receives the incoming information from the IF, ZF which is supplied to the input of a shift register SR1 which is designed similarly to the shift register SR2 and likewise possesses n time slots of which the mutual spacing is determined by the bit number in a block. The time slots 1, 2, . . . n of the shift register SR1 are connected by way of switches s1, s2 . . . sn to the output of the receiving storage means NSP where they are supplied to the regenerator RG. The switches s1, s2 . . . sn are controlled by a corresponding number of outputs from a program control PST which receives the interference information from the interference storage means STSP on corresponding input lines 1, 2 . . . n as illustrated. The two shift registers SR1, SR2 and the program control unit PST are controlled by the bit pulse train T which is supplied by a suitable timing generator (not shown).

The program control unit PST can in a simple manner consist of a conventional microprocessor which has a program that is established to be such that it executes the addition as explained relative to FIG. 3 of accurate data which is composed from two identical data block and eliminates the detected disturbed data. For this purpose the program control unit will interrogate the two time frames of the shift register SR2 at which the interference data of the data blocks having the same content occur and depending upon the interference reported by way of the shift register SR2 will effect a switch-over of the corresponding switches s1 through sn to supply output data from the shift register SR1 in a manner as illustrated in FIG. 3.

Thus, the system offers a reliable communication and data transmission in a simple manner without substantial cost outlay.

Although the invention has been described with respect to preferred embodiments it is not to be so limited as changes and modifications may be made which are within the full intended scope of the invention as defined by the appended claims.

I claim as my invention:

1. The method of transmitting redundant binary coded data information comprising the steps of: frequency or phase modulating said data on a carrier signal and radiating said signal at least twice with time diversity, receiving and detecting said modulated carrier signal, recognizing times of interference in said detected signal by determining amplitude variations, storing said times of interference, frequency or phase demodulating said received detected signal, storing said demodulated signal, and reconstructing said data from said stored demodulated signal by using said stored times of interference.

2. A radio communication transmission system wherein the intelligence in digital form are impressed onto a radio frequency carrier by means of frequency modulation and/or phase modulation and is transmitted with time diversity so that each intelligence block is transmitted at least twice at different times and with the time spacing known at the receiver, including a receiver including an intermediate frequency stage which produces an input signal, an interference recognition device at said receiver which receives said input signal from said I.F. stage and recognizes the presence of amplitude modulation occurring in the output of said intermediate frequency stage caused by interference, a demodulator at the receiver also receiving said input signal from said I.F. stage and demodulating data therefrom, storage means connected to said demodulator and storing said data, an interference storage means connected to said interference recognition device and recording periods during which interference occurs and a program control receiving inputs from said interference storage means and supplying inputs to said data storage means for reconstructing said data.

3. A radio communication system comprising, a transmitter for transmitting binary coded data information which is frequency or phase modulated on a carrier signal and wherein said data is transmitted at least twice in time diversity with a time spacing which is known, a receiver receiving said modulated carrier signal, an amplitude detector receiving an output of said receiver and detecting amplitude variations which indicate interference in the received data by producing signals indicative of periods of interference and periods free of interference, an interference storage device connected to said amplitude detector and recording periods of interference and periods free of interference, a frequency or phase demodulator receiving an output of said receiver and detecting said coded data, receiver storage means receiving the output data from said demodulator and storing it, and a control means receiving inputs from said interference storage device and said receiver storage means and gating information from said receiver storage means so as to reconstruct the transmitted data.

4. A radio communications system according to claim 3, wherein said data is transmitted in blocks with each data block being redundantly transmitted such that the transmitted data can be reconstituted at the output of said receiver storage means.

5. A radio communications system according to claim 4, wherein said receiver storage means and said interference storage device includes a pair of shift registers.

* * * * *